April 16, 1968     O. G. GARNER     3,378,628

DUAL INSULATED TELEPHONE WIRE

Filed Jan. 9, 1967

INVENTOR
Oscar G. Garner
BY Sandoe, Naill,
Schotler & Wikstrom
ATTORNEYS.

United States Patent Office 3,378,628
Patented Apr. 16, 1968

3,378,628
DUAL INSULATED TELEPHONE WIRE
Oscar G. Garner, Westfield, N.J., assignor to General Cable Corporation, New York, N.Y., a corporation of New Jersey
Continuation-in-part of application Ser. No. 442,296, Mar. 24, 1965. This application Jan. 9, 1967, Ser. No. 608,192
6 Claims. (Cl. 174—112)

ABSTRACT OF THE DISCLOSURE

Insulated electrical conductor for telephone and other communication cables, the conductor having a first layer of extruded polyolefin having good insulating properties, but subject to mechanical damage and to heat damage during normal indoor installation procedures, and a color-coded seamless outer layer of extruded semi-rigid polyvinyl chloride insulation directly overlying and in continuous intimate contact with the first layer, the outer layer being mechanically stronger, more resistant to abrasion, and more resistant to heat than the first layer, the outer layer being made up of non-overlapping helically extending zones of different colors bonded together into one piece.

CROSS-REFERENCES TO RELATED APPLICATIONS

This application is a continuation-in-part of application Ser. No. 442,296, filed March 24, 1965, now abandoned.

BACKGROUND AND SUMMARY OF THE INVENTION

This invention relates to insulated conductors for electric cables and more particularly to conductors for cables for use in telephone and other communications systems. Such conductors commonly are from size 18 AWG to size 26 AWG, and up to 5,000 or more of such wires may be assembled, usually in pairs, into a cable of diameter less than 3 inches.

One of the problems in telephone systems has been that outside plant cables could not be brought indoors directly to the frame in central and community dial offices because the outer insulation of the cable conductors was not sufficiently fire-resistant for indoor use; because it was not suitable for the flexing and sharp bends often encountered with installations in restricted areas; and because the conductor insulation was not suitable for withstanding the exposure and mechanical handling that results when a cable sheath is removed and the conductors are fanned out at the main frame through perforated boards to termination lugs.

In the present invention improved conductors for telephone and other communication systems cables have been developed which have a combination of electrical and mechanical properties that make them suitable for use as outside plant cables as well as terminating cables. It is no longer necessary to use separate terminating cables to extend the circuits of incoming telephone cables at a central office or community dial office from the cable vault to the office main frame. The need for a splice in the cable vault outside the office has been eliminated and its cost in time and dollars is saved.

It is an object of this invention to provide still further improvements in insulated conductors for communications cables of the character indicated, and the insulated conductor of this invention includes an outside layer of insulation having the necessary electrical and mechanical properties and made of different strands which are of different colors so as to provide color coding for the cable. While the color coding is obtained by the use of three different strands of colored compound fed to the revolving die by three different extruders, these strands are combined in the revolving extrusion die in the nascent state without the presence of any air. This outer layer of insulation therefore is just as homogeneous as the base insulation. By providing color coding as a result of a composite construction of the outer layer of insulation, this invention eliminates the necessity of a separate color coding step in the manufacture of cable.

Other objects, features and advantages of the invention will appear or will be pointed out as the description proceeds.

BRIEF DESCRIPTION OF THE DRAWINGS

In the drawings, forming a part hereof, in which like reference characters indicate corresponding parts in all the views.

DESCRIPTION OF THE PREFERRED EMBODIMENT

Figure 1:
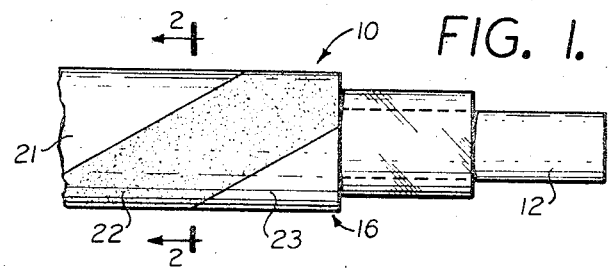
FIGURE 1 is a fragmentary view to greatly enlarged scale, partly broken away, showing the construction of a telephone cable conductor made in accordance with this invention.
Figure 2:
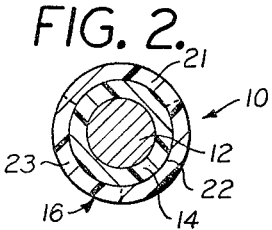
FIGURE 2 is a sectional view taken on the line 2—2 of FIGURE 1.

FIGURES 1 and 2 show an insulated conductor 10 having a wire conductor 12, which is preferably made of copper. The wire conductor 12 may be coated or plated with tin or other metal, but regardless of whether there is a metal coating over the copper wire, this wire is referred to herein as a "bare conductor."

There is a first layer of insulation 14 applied directly over the conductor 12. This first layer of insulation 14 is a plastic insulating material having excellent insulating properties, and it can be chosen for its electrical insulating properties regardless of its mechanical strength or fire resistance, because it is to be protected by a second and outer layer of insulation 16, extruded over the first layer 14 in a manner which will be explained.

The insulating layer 14 is preferably a polyolefin. In the preferred construction, the insulating layer 14 is polyethylene of a dielectric constant of 2.26 to 2.32 between 100 kc. and 1 mc. per second, the type conventionally used for insulations of communication cables, and a dissipation factor of 0.0005 maximum. This material is not satisfactory as an outside insulation because it burns readily and drips burning material, a most undesirable feature for an indoor cable. Furthermore, in the wall thicknesses of polyethylene needed for the desired capacitance level, this insulation is not sufficiently rugged for an outside layer. Moreover it is unduly susceptible to heat damage during soldering operations. For an inner insulation layer it is highly desirable, however, because of its low dielectric constant.

The actual thickness of the first layer 14 depends upon the gauge of the wire conductor 12, but it is between one-half and two-thirds of the radial thickness of the combined layers of insulation 14 and 16. For conventional telephone cables a radial thickness of 10 mils for the first layer is satisfactory. The first layer 14 can be either solid or foam material. It is preferable to use a polyethylene of low density and high molecular weight, such as that manufactured by Union Carbide and sold under the designation "DFDA–6033." In place of this particular polyethylene, one may substitute a high density polyethylene, polyproplene or copolymers of polyolefins.

The second layer of insulation 16 is made of material which is mechanically stronger and more resistant to abrasion than the first layer 14; and the second layer 16 is also more resistant to fire. Polyvinyl chloride is the preferred material for the second insulation layer 16, and this polyvinyl chloride is compounded with less than the usual amount of plasticizer so as to produce a "semi-rigid" insulation. This expression "semi-rigid" is used herein to designate material testing between about 70 C and 90 C on the durometer hardness scale. Hardness is indicated at room temperature. The semi-rigid compound has superior electrical properties compared to the fully plasticized conventional polyvinyl chloride compound. The SIC of the semi-rigid compound is about 3.4 in contrast to an SIC for the fully plasticized compound of 6.0

The semi-rigid polyvinyl chloride of this invention has higher tensile strength than a comparable resin with more plasticizer. This is an important advantage in that it makes the outer insulation tougher, and it is also important in that the lower plasticizer percentage in the outer layer protects the inner layer 14 from being degraded in its electrical properties when a layer of the hot polyvinyl chloride is extruded over the polyethylene. A still further advantage of the reduced plasticizer content is that the outer insulation 16 has increased compression resistance.

Conventional polyvinyl chloride insulation contains about 60 parts of plasticizer to 100 parts of the polyvinyl chloride resin. The "semi-rigid" insulation 16 used for this invention contains between 20 and 30 parts of plasticizer for 100 parts of resin. "Parts" referred to herein are by weight. Such a reduction in the amount of plasticizer raises the tensile strength of the polyvinyl chloride from about 2250 pounds per square inch to about 3700 pounds per square inch or more. These values are given merely by way of illustration. The difference in toughness of the semi-rigid as compared to the conventional general purpose polyvinylchloride compound is shown by the cut-through resistance at room temperature conducted on 0.070 inch slabs. In this test the semi-rigid compound has a cut-through resistance of 1100 pounds while the value is 420 pounds of the conventional compound.

The low plasticizer content of the polyvinyl chloride compound prevents contamination of the underlying polyethylene insulation resulting from migration of the plasticizer.

The higher viscosity and the greater resistance to flow through the extruder causes a gradual decomposition of the semi-rigid compounds used for the outer layer of insulation if a crosshead type of extruder is used. In line with the lower plasticizer content of the semi-rigid insulation it takes temperatures in order of 375–400° F. to extrude this compound. In contrast, the conventional compounds are extruded at from 325–350° F. The higher temperature is required because of the higher melt viscosity of the semi-rigid compound. This is the reason why it is not practical to extrude continuously semi-rigid polyvinyl chloride insulation using a normal crosshead extruder without some decomposition. Experience has shown, however, that by use of a straight-through type of extruder such as disclosed in the Allemann Patent 2,674,007 it is possible to use a semi-rigid insulating compound with low plasticizer percentage, so as not to significantly degrade the underlying layer of polyethylene insulation. This type of extruder permits the simultaneous extrusion of 2, 3 and 4 different base colors and makes possible a total number of different markings of more than 200.

The preferred plasticizer for the insulation 16 is the electrical grade di-2-ethylhexyl phthalate. Examples of other plasticizers that can be used are di-2-ethylhexyl adipate; tricresyl phosphate; and di-cyclohexyl phthalate. Small amounts of other materials, such as stabilizers, can be added to the polyvinyl chloride in accordance with conventional practice.

The polyvinyl chloride may be made either by the suspension process or by the emulsion process. In place of polyvinyl chloride other plastics can be used, such as copolymers with vinyl acetate and vinylidene chloride.

Although the polyvinyl chloride insulation could be applied directly to the bare conductor, such as insulation is unsatisfactory for conductors for communications systems cables because the polyvinyl chloride has a dielectric constant of 4.0 or more, and for a telephone cable, the desired mutual capacitance of 0.083 $\mu$f. per mile could only be efficient with thick insulation and coresponding-ly large and expensive cables. The electrical characteristics of polyvinyl chloride compounds compare unfavorably with those of polyolefins, such as polyethylene, as electrical insulators.

The insulation 16 is of composite construction and it consists of a plurality of different strands 21, 22 and 23, helically extruded over the first layer 14. Each of the strands 21, 22 and 23 is a different color from the other strands so that the composite outer layer 16 provides color coding for the insulated conductor 10. The different strands 21, 22 and 23 are extruded in a manner that locates them close together and with successive convolutions of different strands touching one another so that the insulation 16 is continuous in extent. The three colored strands 21, 22 and 23 are applied at temperatures between 375 and 400° F. to the insulated conductor in the nascent state in a straight through type extruder and it is the absence of air which permits a perfect, seamless bond between the strands, giving a homogeneous insulation free of any voids or discontinuities. This makes the layer of insulation 16 a one-piece construction. The only differences between the strands are the pigments added to give them a difference in color.

Figure 3:
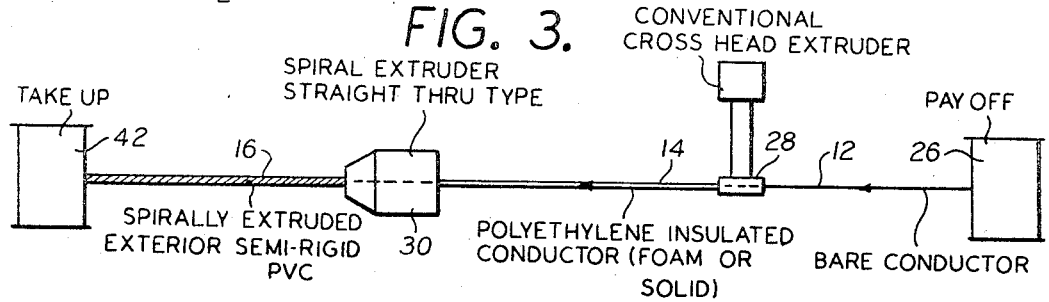
FIGURE 3 is a diagrammatic view showing one method of making the cable conductor shown in FIGURES 1 and 2.

FIGURE 3 is a diagrammatic showing of one method by which the insulated conductor of FIGURES 1 and 2 can be made. The bare conductor 12 is unwound from a payoff spool 26 and passed through a conventional crosshead extruder 28 which applies a sleeve of plastic over the bare conductor. This sleeve of plastic is the first layer of insulation 14. Some distance beyond the extruder 28, the conductor, with its first insulation layer 14, passes through a second extruder 30. This extruder 30 is a helical extruder and has a die which rotates as it extrudes a plurality of strands 21, 22 and 23 (FIGURE 1) to form the second insulation layer 16.

The helical extruder 30 (FIGURE 3) can be made in accordance with the disclosure of Patent 2,674,007, issued Apr. 6, 1954 to Allemann et al.

Figure 6:
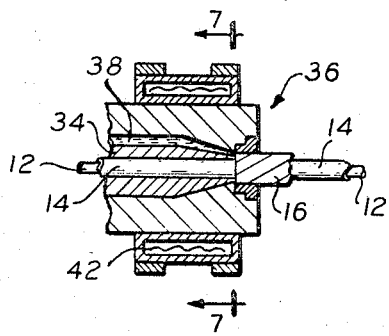
FIGURE 6 is a diagrammatic, fragmentary sectional view through helical extruding apparatus shown diagrammatically in FIGURES 3 and 5.
Figure 7:
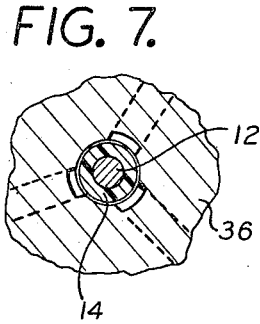
FIGURE 7 is an enlarged sectional view taken on the line 7—7 of FIGURE 6.

FIGURES 6 and 7 show the construction of the die portion of the extruder 30. The conductor 12, with the first layer of insulation 14, is fed through a guide 34 of a rotating die 36. The die illustrated has three passages 38 through which plastic is extruded over the longitudinally traveling conductor 12. Each of the passages 38 is supplied with molten plastic under pressure and from a different supply hopper so as to extrude a different colored strand over the first insulation layer 14. The speed of longitudinal movement of the conductor 12 and its insulation layer 14 is correlated with the rotary speed of the die 36, so as to obtain convolutions of plastic from the different passages or nozzles 38 which contact with one another to form a continuous outer layer of insulation 16, as previously explained. There are heating means 40 on the die 36 for maintaining the temperature of the plastic up until the time that the different strands are actually extruded into contact with the first layer 14, successive convolutions of the plastic strands being in contact with one another.

Referring again to FIGURE 3, the conductor with the outer insulation 16 travels for a distance sufficient to permit hardening of the plastic insulation 16, and the finished insulated conductor is wrapped on a take-up spool 42.

The type of extruder head shown in FIGURE 6, with the passages 38 discharging the plastic to the traveling conductor in a direction substantially the same as the direction of the travel of the conductor, has important advantages in using a "semi-rigid" outer layer of insulation. Such insulation, with its reduced amount of plasticizer, does not flow easily and presents serious disadvantages in extruders which have sharp curves for changing the direction of flow of the plastic near the discharge end of the plastic passages. A "straight through" helical extruder of the type illustrated in FIGURES 6 and 7 is, therefore, preferable for applying the second layer of insulation of this invention.

Figure 4:
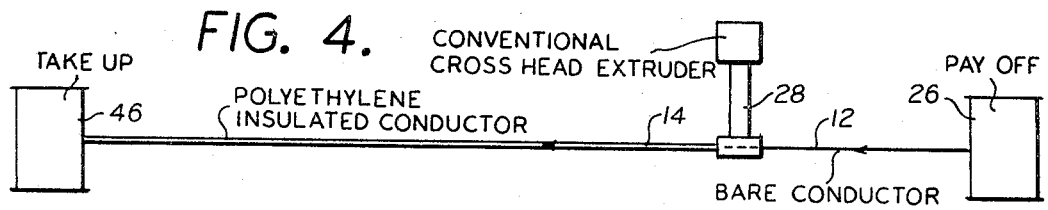
FIGURES 4 and 5 are diagrammatic views showing successive steps of a modified method for making the cable conductor shown in FIGURES 1 and 2.
Figure 5:
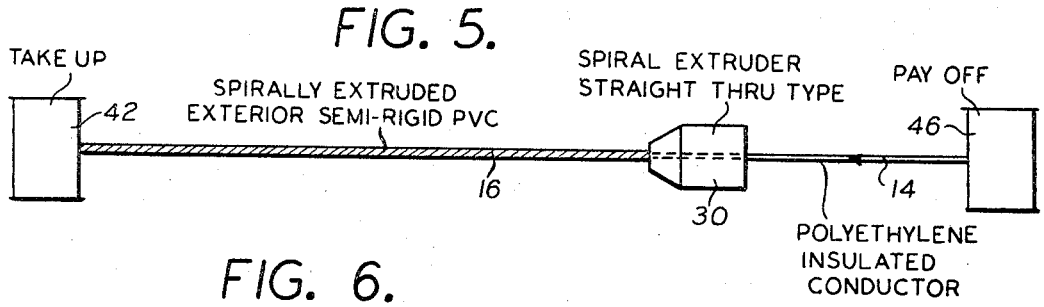

Because of the different rate at which the first layer of insulation can be applied, as compared to that at which the composite second layer, with its different strands, can be applied, there are advantages in using the process illustrated in FIGURES 4 and 5. These figures show a two-step operation in which the conductor 12 is unwrapped from a payoff spool 26 and is advanced through the extruder 28 at as high a speed as can be effectively used for applying the polyethylene or other first layer 14 of insulation to the bare conductor 12. Beyond the extruder 28, the conductor advances far enough to cool the plastic insulation 14 and the conductor is then wound on a takeup spool 46.

This spool 46 is subsequently used as a payoff spool to advance the conductor with its insulation layer 14 to the helical extruder 30 which operates in the same way as already described to apply the second layer of insulation 16 to the conductor, and after passing along a run of sufficient extent to cool the insulation 16, the completed insulated conductor is wrapped on the takeup spool 42.

The insulated conductors of this invention are combined in cables in accordance with conventional practice and they provide a telephone cable of wider application and with color coding which extends in non-overlapping relation all the way through the outer layer of insulation.

The following compounding of polyvinyl chloride for the outer layer of insulation is given by way of illustration:

*Example 1*

|  | Parts |
|---|---|
| Polyvinyl chloride resin | 100 |
| Di-2-ethylhexyl phthalate | 23.46 |
| Tribasic lead sulphate | 3.70 |
| Cadmium-barium stabilizer | 1.85 |
| Barium stearate | 0.74 |
| Cadmium stearate | 0.49 |

*Example 2*

| | |
|---|---|
| Polyvinyl chloride resin | 100 |
| Tricresyl phosphate | 30.0 |
| Dibasic lead phthalate, surface coated | 10.0 |
| Dibasic lead stearate | 0.5 |

The greater abrasion resistance of the dual insulated wire consisting of a polyethylene base with a polyvinyl chloride color coated second insulating layer is shown by the following test made on the compound of Example 1. Slabs were prepared about 0.030 inch thick from both semi-rigid polyvinyl chloride and low density polyethylene. Both slabs were exposed to 2000 cycles of a repeated scrap abrasion machine with 750 gram load ⅜" travel at a rate of 60 cycles per minute and a 16 mil steel wire used as the abrading tool. After 2000 cycles the thickness of the semi-rigid polyvinyl chloride slab showed no change—there was no abrasion. In contrast the polyethylene slab lost about one-half of its thickness due to abrasion.

Changes and modifications can be made in the invention and some features can be used in different combinations without departing from the invention as defined in the claims.

I claim:

1. An insulated conductor for telephone and other communications cables including a conductor, a first layer of electrical insulation applied directly to the conductor, said first layer being made of a polyolefin which has good electrical insulating properties, but is susceptible to mechanical damage and to heat damage during soldering operations, and a color-coded outer layer of thermoplastic electrical insulation which is mechanically stronger, more resistant to abrasion, and more resistant to fire than the material of the first layer, the outer layer being semi-rigid with its hardness between about 70C and 90C (durometer), the outer layer contacting directly with the inner layer around the entire circumference thereof and axially along the length of the cable, with the interfaces of the layers free of air pockets and bonded as is obtained when an outer layer in a molten state is extruded over an inner layer, the outer layer being made up of helically extending zones of different colors for color coding the conductor, each color extending radially through the full thickness of the outer layer and each zone meeting the adjacent zone along a helical path that is straight in generally radial directions so that there is no axial overlapping of the adjacent zones, the differently colored zones being made of the same kind of thermoplastic material and the material of the different zones being fused together into a seamless one-piece layer and the material of the outer layer being of substantially uniform density and thickness both circumferentially and axially as though hardened directly from a molten state in which the material of all zones were extruded simultaneously from a common extruder die layer and each zone meeting the adjacent zone along a helical path that is straight in generally radial directions so that there is no axial overlapping of the adjacent zones, the differently colored zones being made of the same thermo-plastic material and the different zones being of one-piece construction with one another and of substantially uniform density along its axial length.

2. The insulated conductor described in claim 1 characterized by the outer layer being made of semi-rigid polyvinyl chloride containing a plasticizer that is compatible with the material of the first layer of insulation, said outer layer having a hardness between about 70C and 90C (durometer), and being in intimate contact with the inner layer throughout the entire area of the interface at which the first layer and the outer layer confront one another, and the thickness of the inner layer being between one-half and two-thirds the thickness of the combined layers.

3. The insulated conductor described in claim 2 characterized by the outer layer of insulation including 100 parts of polyvinyl chloride resin combined with between approximately 20 to 25 parts of plasticizer.

4. The insulated conductor described in claim 3 characterized by the plasticizer being from the group consisting of electrical grade di-2-ethylhexyl phthalate; di-2-ethylhexyl adipate; tricresyl phosphate; and di-cyclohexyl phthalate.

5. The insulated conductor described in claim 4 characterized by the outer layer of insulation having approximately the following formula:

|  | Parts |
|---|---|
| Polyvinyl chloride resin | 100 |
| Di-2-ethylhexyl phthalate | 23.46 |
| Tribasic lead sulphate | 3.70 |
| Cadmium-barium stabilizer | 1.85 |
| Barium stearate | 0.74 |
| Cadmium stearate | 0.49 |

6. The insulated conductor described in claim 1 characterized by the communication cable being of a size between about 18 AWG and 26 AWG, the outer layer being as homogeneous throughout as the base layer, and the base layer being free of contamination by migration of plasticizer from the outer layer, and having a thickness of 5 to 10 mils.

References Cited

UNITED STATES PATENTS 2,349,413   5/1944   Hemperly   174—110
2,708,215   5/1955   Kaganoff   174—110

FOREIGN PATENTS 751,565   6/1956   Great Britain.
938,825   10/1963   Great Britain.

DARRELL L. CLAY, *Primary Examiner.*

E. GOLDBERG, *Assistant Examiner.*